Feb. 7, 1967   J. W. ANGUS   3,302,461
SCALE ERROR CORRECTED ALTIMETER
Filed July 19, 1965   2 Sheets-Sheet 1
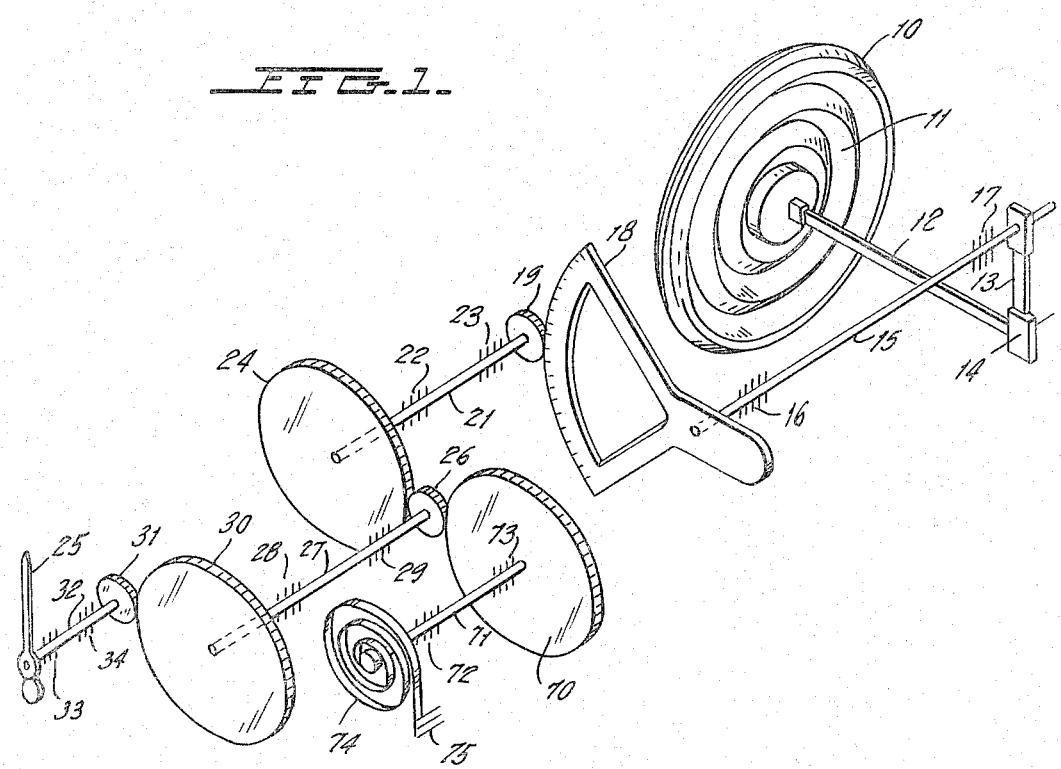
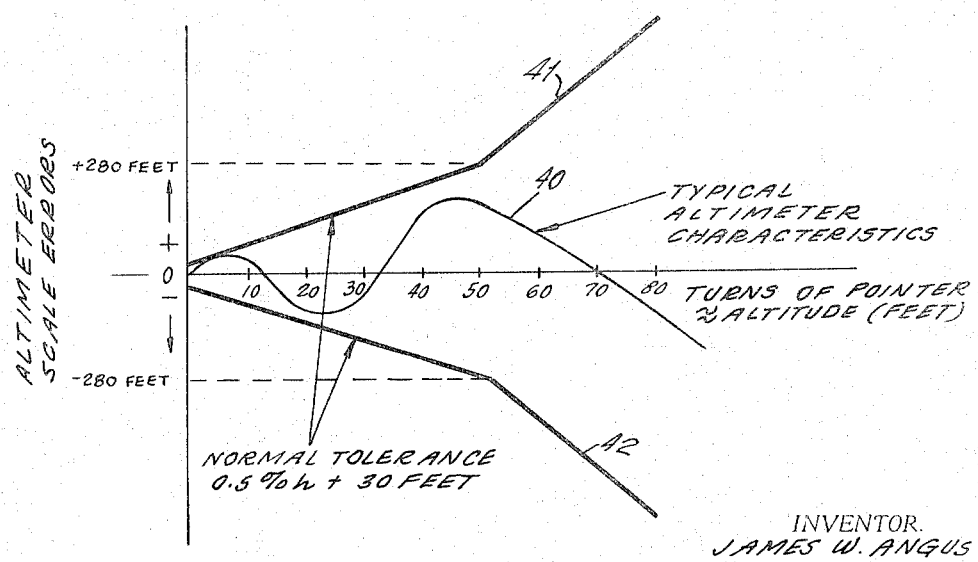
INVENTOR.
JAMES W. ANGUS
BY
OSTROLENK, FABER, GERB & SOFFEN
ATTORNEYS

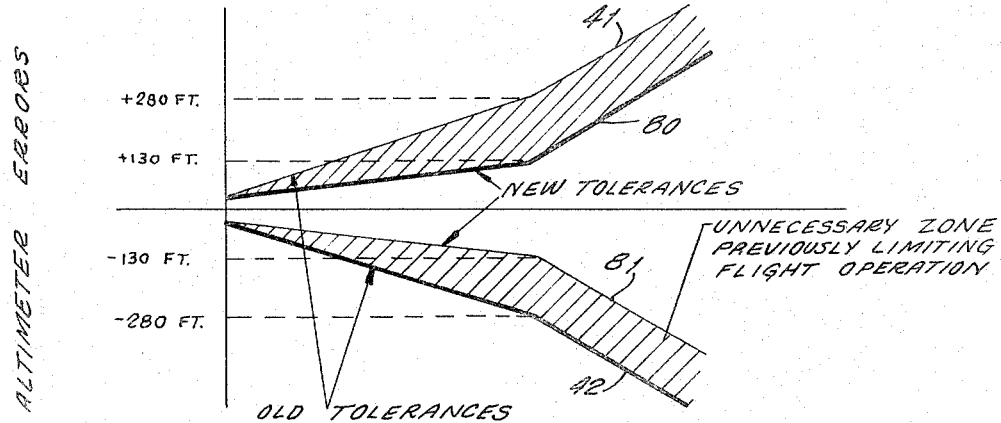
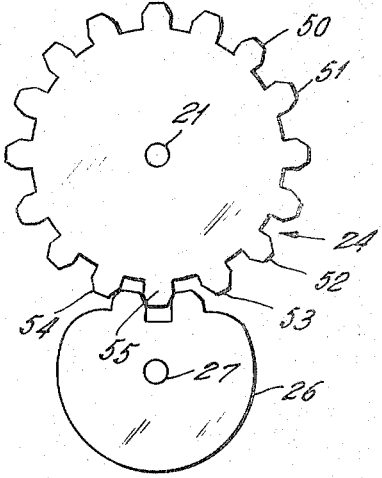
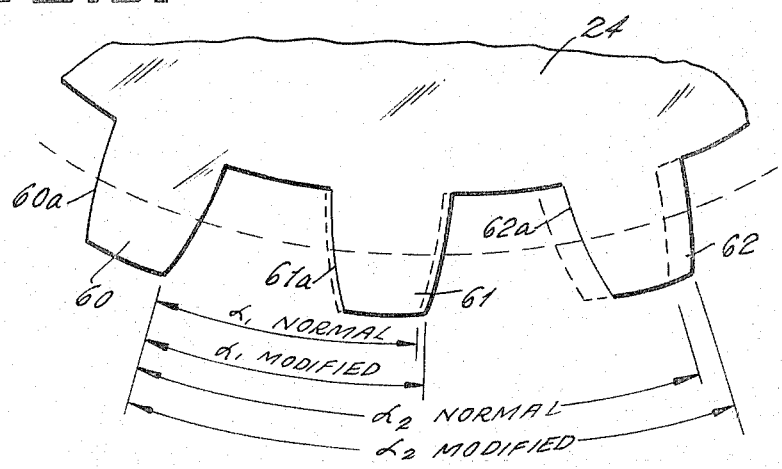

United States Patent Office 3,302,461
Patented Feb. 7, 1967

3,302,461
SCALE ERROR CORRECTED ALTIMETER
James W. Angus, Chappaqua, N.Y., assignor to Kollsman Instrument Corporation, Elmhurst, N.Y., a corporation of New York
Filed July 19, 1965, Ser. No. 472,983
10 Claims. (Cl. 73—386)

This invention relates to a pressure altimeter, and more particularly relates to a pressure altimeter wherein the linkage connecting the pressure capsule to the indicator includes a gear means wherein the teeth have variable spacing to introduce correction of inherent errors in the linearity characteristic of the pressure capsule.

Present-day pressure altimeters are currently made to scale error tolerances of 0.5% times the altitude reading plus 30 feet. The tolerance is made up partly of random errors in the manufacture of the device, and a major portion of the error is comprised of a fundamental error peculiar to the specific design of the pressure capsule. Thus, it can be shown that the major error of pressure altimeters is a highly repeatable sine wave about a linear characteristic due to the inherent properties of the pressure capsule. That is, all pressure altimeters of the same type, having the same type pressure capsule will all exhibit substantially the same sinusoidal error characteristic.

In accordance with the present invention, the gear train which connects the pressure capsule to the indicating device such as a pointer includes therein at least one gear having the teeth so spaced that it will compensate for this sine wave error. Therefore, the accuracy of the pressure altimeter incorporating this relatively minor change can be increased so that its error is only 0.16% times the altitude reading plus 20 feet.

Accordingly, a primary object of this invention is to increase the accuracy of pressure altimeters.

Another object of this invention is to provide novel means for compensating for the inherent inaccuracies in a pressure capsule.

Yet another object of this invention is to increase the accuracy of instruments using pressure transducers connected to indicating means by inserting in the connecting linkage a gear having teeth which are selectively spaced to compensate for the inaccuracy.

A further object of this invention is to provide a gear in the transmission likage from a pressure capsule to an indicating pointer wherein the angular rotation of the gear corresponds to the expansion of the capsule, and the teeth of the gear are asymmetrically spaced at predetermined angular positions on the gear to compensate for known inaccuracies in the expansion of the capsule.

These and other objects of this invention will become apparent from the following description when taken in connection with the drawings, in which:

FIGURE 1 is a perspective diagram of a well-known type of pressure altimeter which can be modified in accordance with the invention.

FIGURE 2 shows the altimeter sinusoidal error characteristic as a function of altitude.

FIGURE 3 illustrates the limit curve of FIGURE 2 as modified by incorporating the novel selectively spaced gear teeth in accordance with the invention.

FIGURE 4 is a plan view schematically illustrating a gear having asymmetric spacings between the teeth which cooperate with a cooperating gear.

FIGURE 5 is an enlarged view of a few of the adjustably or asymmetrically spaced teeth of the gear of FIGURE 4.

Referring first to FIGURE 1, I have illustrated therein a typical pressure altimeter which can, for example, be made in accordance with the detailed disclosure of U.S. Patent No. 3,283,582.

The altimeter of FIGURE 1 has been shown in simplified fashion as including a sealed pressure capsule 10 which is evacuated with the entire assemblage contained within a sealed housing connected to external atmosphere. Thus, as the pressure within the measuring instrument decreases, the differential pressure on the capsule 10 decreases, thereby permitting the movable wall 11 of capsule 10 to expand. The movable wall 11 is connected to an output link 12 which is, in turn, pivotally connected to a crank arm 13 as by the pivot pin 14. The upper end of crank arm 13 is then directly secured to a rotatable shaft 15 which is pivotally supported by suitable pivotal supports or bearings 16 and 17. The end of shaft 15 is then directly connected to sector gear 18 which meshes with the input gear 19 of a gear train.

The gear train includes shaft 21 extending from gear 19 which is pivotally supported in fixed bearings 22 and 23, and is connected to gear 24.

As will be described more fully hereinafter, and in a selected embodiment of the invention, the crank arm 13 and shaft 15 will typically rotate approximately 50°, or more generaly, less than 90°, for the full motion or full range of motion of wall 11. It is necessary to translate this 50° angular motion of the shaft 15 into a rotation of pointer 25 equivalent to full scale which may be approximately 80 complete revolutions. That is, in a standard altimeter, one full turn of pointer 25 will correspond to an altitude change 1,000 feet where the instrument is designed for indicating from 0 to 80,000 feet. Clearly, the device will be suitably modified for different ranges of indication. Other indicia, not shown, indicate feet in thousands, and ten thousands, in the usual manner.

It should also be noted that the invention is generally applicable to other linear multi-revolution instruments such as absolute and differential pressure indicators and sensitive airspeed indicators.

In accordance with the invention, the tooth spacing of at least one of the gears in the gear train is such that there is automatic compensation for the inherent and known error of capsule 10 (and other capsules that may be in the system). Preferably, this modification is performed on a gear that makes one single full revolution for the 50° rotation of shaft 15, and the 80 full rotations of pointer 25. In presently existing altimeters, the gear 24 will make approximately a single complete revolution for the full range of the instrument and this gear could be selected to have the desired tooth spacing modification.

The remainder of the gear train includes a gear 26 connected to shaft 27 which is rotatably mounted in fixed pivots or bearings 28 and 29. The shaft 27 then drives a large gear 30 which meshes with a small output gear 31 which is connected to an output shaft 32 pivotally mounted in fixed bearings or pivots 33 and 34. The rotatable indicia or pointer 25 is then connected to the opposite end of shaft 32.

As described above, it has been found that a large portion of the error in altimeters of the type shown in FIGURE 1 will follow the same pattern for the same instrument type, shown by the generally sinusoidal or undulating line 40 in FIGURE 2. Thus, in FIGURE 2, and due to the inherent non-linear characteristics of the capsule 10 to link and crank arms which do not follow an absolutely linear pattern of the pressure function as a function of the expansion of the capsule 10, the output curve will usually exhibit two maximum positive errors at approximately 8,000 feet and 45,000 feet, and a maximum negative at approximately 22,000 feet.

When the remaining errors, caused by manufacturing variances and the like, are added into the major capsule error, the altimeter characteristic will have errors of the order of 0.5% times the altitude reading plus 30 feet. The envelopes of this error are illustrated in FIGURE 2 by the positive envelope 41 and the negative envelope 42.

The principle of the present invention is to form one of the gears in the gear train of FIGURE 1, and preferably the gear that makes a single rotation for the complete range of the instrument which is gear 24, with adjustably spaced teeth which will compensate for the known error shown in curve 40.

Through the use of well-known precision gear techniques, it has been found possible and practical to space the gear teeth on the gear 24 irregularly and to the characteristic 40 of FIGURE 2, thereby substantially eliminating the normal kinematic error wave. Note that the gear 24 in practice will be a fine pitch gear having approximately 200 teeth and a pitch diameter of one inch.

In adjusting the spacing of the teeth, the tooth thickness of the normal gear is altered so that the distance between the leading surfaces of the engaging teeth will be asymmetrically spaced. Preferably, this spacing will not alter between adjacent teeth by more than a small percentage of approximately 3%.

This arrangement is schematically illustrated in FIGURE 4 for gear 24 which engages gear 26. Thus, in FIGURE 4, the gear teeth 50 and 51 have modified spacing so that a modified shaft rotation will be required of shaft 21 to advance the gear 24 by the same distance as if the gear had uniformly spaced teeth. Therefore, when the gear teeth 50 and 51 mesh with the gear 26, the positive errors existing between, for example, the 32,000 and 70,000 foot mark in FIGURE 2 would be eliminated. Note that in this 32,000 feet to 70,000 feet region, the corresponding 126° angular segment of gear 24 engaging gear 26 will have teeth spaced by greater and greater distances when approaching the center of the segment from its ends.

A similar group of teeth 52 and 53 will be arranged at a suitable angular position on gear 24 so as to mesh with the gear 26 in the zero to 12,000 foot range, thereby again decreasing the positive error due to the too great an expansion rate of capsule 10 from a linear value in this range.

The modified tooth spacing between teeth 54 and 55 engage gear 26 to overcome the full negative error which appears from the 12,000 to 32,000 foot range in FIGURE 1. That is to say, by using modified tooth spacing, a minimum spacing is provided between teeth so that relatively small rotation of shaft 21 will indicate some particular pressure change. When, however, the error is zero as at the 12,000, 32,000 and 70,000 foot marks, the tooth spacing width will be somewhat reduced so that the same per unit pressure change will not cause as great a rotation of the shaft 27.

Finally, the teeth are separated by the greatest distance as are teeth 50 through 53 where it is desired to compensate for the maximum positive error in FIGURE 2.

This may be further understood by reference to FIGURE 5 which illustrates three teeth 60, 61 and 62 which are shown withe normal spacing and also with modified spacing to compensate for positive errors.

The cooperating gear 26 will have its teeth arranged to mesh with teeth which have the full thickness of tooth 60. However, the gear 24 is so designed that if all of its teeth had the spacing of tooth 60, there would result normal error in the curve of FIGURE 2, since a per unit pressure change would cause too great a rotation of the indicating pointer 25.

In accordance with the invention, the lesser spacing of teeth is used in the negative error areas of FIGURE 2 from between 12,000 to 32,000 feet and from 70,000 feet and on, so that the per unit pressure change will not cause as great a rotation of pointer 25 at all regions except those of maximum negative error.

Clearly, the exact amount of compensation required for any particular altitude which corresponds to some particular angular rotation of gear 24 will be adjusted by making the tooth spacing gradually narrower with maximum deviations of about 3% in tooth spacing changes.

Thus, the spacing from the front surface 60a of tooth 60 to the front surface 61a of tooth 61 has been gradually increased since the forward attack surface of tooth 61 has been reduced from the full dotted line to the solid line. Therefore, when tooth 61 is in the region of engagement with gear 26, a smaller but still negative error correction will be made.

Finally, as the tooth spacing is made greater and greater, as with tooth 62, the spacing from the forward attack surface 61a of tooth 61 to the attack surface 62a of tooth 62 will be sufficiently great to begin to introduce compensation for positive errors in the altitude characteristic.

It will be apparent that it is necessary, since there is a change in tooth thickness, that the mating gear or pinion 26 should be biased toward constant contact with only one side of the teeth of gear 24 to eliminate increased looseness in engagement between gears, and thus an increased random error. To this end, an additional gear 70 is provided in meshing engagement with gear 26, with the gear 70 carried on a shaft 71 which is pivotally supported by the bearings 72 and 73. A hair spring 74 which has one end thereof fixed at fixed point 75 is then connected to the opposite end of shaft 71, thereby to bias the gear 70 and thus the gear 26 into continuous contact with gear 24.

When using the adjustably spaced gear tooth described above, it has been found that the previous tolerance of 0.5% times the altitude reading plus 30 feet can be decreased to 0.16% times the altitude reading plus or minus 20 feet. This change is illustrated in FIGURE 3 which superimposes the new tolerance envelopes 80 and 81 on the original tolerance envelopes 41 and 42, respectively. The shaded regions illustrate the zone previously limiting flight operation as compared to altimeters using the present invention.

Thus, with the present invention, and at 35,000 feet, there is a new tolerance of plus or minus 75 feet of error as compared to the original plus or minus 205 feet of error. This would amount to a saving of 260 feet on a separation level between two aircraft equipped with instruments of the type described herein, thereby substantially reducing the possibility of mid-air collision.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A pressure sensitive device comprising a pressure sensitive capsule having an expandable wall movable responsive to charges in pressure across said wall, an output link connected to said wall; a crank arm connected to said output link, a rotatable shaft connected to said crank arm, a train of gears including an input gear and output gear; said input gear connected to said shaft; and a rotatable indicia means connected to said output gear; said gear train having a gear ratio for rotating said indicia a predetermined number of turns for less than 90° of rotation of said rotatable shaft; said pressure sensitive capsule having a characteristic of pressure to movement of its said expandable wall which varies generally sinusoidally about a linear characteristic; one of the gears of said gear train rotating 360° for said predetermined number of turns of said indicia; the teeth of said one of said gears variably spaced from one another to require greater or lesser rotation of said one of said gears for a given pressure increment at rotation angles corresponding to the said sinusoidal characteristic of said pressure sensitive capsule to decrease the amplitude of the difference of the indication of said indicia from a linear relation between movement of said wall and pressure for said pressure capsule.

2. An altimeter having an error of less than 0.16% of the altitude in feet plus 20 feet; said altimeter comprising a pressure sensitive capsule having an expandable wall movable responsive to changes in pressure across said wall; an output link connected to said wall; a crank arm connected to said output link, a rotatable shaft connected to said crank arm, a train of gears including an input gear and output gear; said input gear connected to said shaft; and a rotatable indicia means connected to said output gear; said gear train having a gear ration for rotating said indicia a predetermined number of turns for less than 90° of rotation of said rotatable shaft; said pressure sensitive capsule having a characteristic of pressure to movement of its said expandable wall which varies generally sinusoidally about a linear characteristic; one of the gears of said gear train rotating 360° for said predetermined number of turns of said indicia; the teeth of said one of said gears variably spaced from one another to require greater or lesser rotation of said one of said gears for a given pressure increment at rotation angles corresponding to the said sinusoidal characteristic of said pressure sensitive capsule to decrease the amplitude of the difference of the indication of said indicia from a linear relation between movement of said wall and pressure for said pressure capsule.

3. The device substantially as set forth in claim 2 which includes a backlash spring having one end thereof fixed and the other end thereof connected to said gear train; said backlash spring biasing the forward surface of the teeth of said one of said gears toward engagement with the teeth of its cooperating gear in said gear train.

4. The device substantially as set forth in claim 3 wherein the spacing between the teeth of said one of said gears varies by a maximum of about 3%; said adjustable spacing being defined by adjusted tooth thickness of the teeth of said one of said gears.

5. A pressure sensitive device comprising a pressure transducer having an output member which moves non-linearly and in an undulating manner with respect to pressure applied to said pressure sensitive device, a first and second meshing gear means, and a movable indicia movable over a predetermined range with closer linearity of said applied pressure than said pressure transducer; said first gear connected to said output member, said second gear connected to said movable indicia; one of said first or second gear having symmetrically spaced teeth; the other of said first or second gear having diversely spaced teeth; the spacing of said diversely spaced teeth compensating the undulating characteristic of said pressure capsule and having a wider spacing at angular positions corresponding to increased movement of said output member for a given pressure change and a smaller spacing at angular positions corresponding to decreased movement of said member for said given pressure change.

6. The device as set forth in claim 5 wherein said one of said gears rotates approximately 360° for the full range of movement of said movable indicia.

7. A pressure sensitive device comprising a pressure sensitive capsule having an expandable wall movable responsive to changes in pressure across said wall, an output link connected to said wall; a crank arm connected to said output link, a rotatable shaft connected to said crank arm, a train of gears including an input gear and output gear; said input gear connected to said shaft; and a rotatable indicia means connected to said output gear; said crank arm having a characteristic of pressure to movement thereof which varies generally sinusoidally about a linear characteristic; the teeth of said one of said gears variably spaced from one another to require greater or lesser rotation of said one of said gears for a given pressure increment at rotation angles corresponding to the said sinusoidal characteristic of said crank arm to decrease the amplitude of the difference of the indication of said indicia from a linear relation between movement of said wall and pressure for said crank arm.

8. A pressure sensitive device comprising a pressure sensitive capsule having an expandable wall movable responsive to changes in pressure across said wall, an output link connected to said wall; a crank arm connected to said output link, a rotatable shaft connected to said crank arm, a train of gears including an input gear and output gear; said input gear connected to said shaft; and a rotatable indicia means connected to said output gear; said gear train having a gear ratio for rotating said indicia a predetermined number of turns for less than 90° rotation of said rotatable shaft; said crank arm having a characteristic of pressure to movement thereof which varies generally sinusoidally about a linear characteristic; the teeth of said one of said gears variably spaced from one another to require greater or lesser rotation of said one of said gears for a given pressure increment at rotation angles corresponding to the said sinusoidal characteristic of said crank arm to decrease the amplitude of the difference of the indication of said indicia from a linear relation between movement of said wall and pressure for said crank arm.

9. A pressure sensitive device comprising a pressure sensitive capsule having an expandable wall movable responsive to changes in pressure across said wall, an output link connected to said wall; a crank arm connected to said output link, a rotatable shaft connected to said crank arm, a train of gears including an input gear and output gear; said input gear connected to said shaft; and a rotatable indicia means connected to said output gear; said gear train having a gear ratio for rotating said indicia approximately 80 turns for approximately 50° of rotation of said rotatable shaft; said crank arm having a characteristic of pressure to movement thereof which varies generally sinusoidally about a linear characteristic; one of the gears of said gear train rotating approximately 360° for said approximately 80 turns of said indicia; the teeth of said one of said gears variably spaced from one another to require greater or lesser rotation of said one of said gears for a given pressure increment at rotation angles corresponding to the said sinusoidal characteristic of said crank arm to decrease the amplitude of the difference of the indication of said indicia from a linear relation between movement of said crank arm and pressure; said characteristic of said crank arm defining normally high pressure readings at approximately 8 and 45 thousand feet altitude readings and a normally low pressure reading at approximately 22 thousand feet altitude; the spacing of said teeth of said one of said gears being relatively close at rotation angles corresponding to 22 thousand feet altitudes and relatively wide at rotation angles corresponding to 8 and 45 thousand feet.

10. A pressure sensitive device comprising a pressure transducer having an output member which moves non-linearly and in an undulating manner with respect to pressure applied to said pressure sensitive device, a first and second meshing gear means, and a movable indicia movable over a predetermined range with closer linearity of said applied pressure than said pressure transducer; said first gear connected to said output member, said second gear connected to said movable indicia; one of said first or second gear having symmetrically spaced teeth; the other of said first or second gear having adjustably spaced teeth; the spacing of said adjustably spaced teeth compensating the undulating characteristic of said pressure capsule and having a wider spacing at angular positions corresponding to increased movement of said output member for a given pressure change and a smaller spacing at angular positions corresponding to decreased movement of said output member for said given pressure change; said characteristic of said pressure transducer defining normally high pressure readings at first and second altitude readings and a normally low pressure reading at a third altitude reading intermediate said first and second altitude readings; the spacing of said teeth of said one of said gears being relatively close at rotation angles corresponding to said third altitude reading and relatively wide at rotation angles corresponding to said first and second altitude readings.

References Cited by the Examiner

UNITED STATES PATENTS

| | | | |
|---|---|---|---|
| 2,585,971 | 2/1952 | Sloane | 74—393 |
| 3,154,948 | 11/1964 | Anderson | 73—386 |
| 3,222,932 | 12/1965 | Henneman | 73—386 |

LOUIS R. PRINCE, *Primary Examiner.*

N. B. SIEGEL, *Assistant Examiner.*